May 1, 1962 K. A. ROBINSON ETAL 3,032,668

CONTROL OF ELECTRIC MACHINES

Filed May 22, 1959 2 Sheets-Sheet 1

Inventors
Kenneth Arthur Robinson
William Henry Woodward
Ronald John Frederick Howard Dowell & Dowell
Attorneys May 1, 1962 K. A. ROBINSON ETAL 3,032,668

CONTROL OF ELECTRIC MACHINES

Filed May 22, 1959 2 Sheets-Sheet 2

Inventors
Kenneth Arthur Robinson
William Henry Woodward
Ronald John Frederick Howard
By Dowell & Dowell
Attorneys 3,032,668
Patented May 1, 1962

3,032,668
CONTROL OF ELECTRIC MACHINES

Kenneth Arthur Robinson, Etchinghill, near Rugeley, William Henry Woodward, Weeping Cross, Stafford, and Ronald John Frederick Howard, Slitting Mill, near Rugeley, England, assignors to Lancashire Dynamo Electronic Products Limited, Rugeley, Staffordshire, England, a British company Filed May 22, 1959, Ser. No. 815,192
4 Claims. (Cl. 310—95)

This invention relates to the control of electrical machines and particularly to apparatus employing transistor amplifiers for controlling the speed of electrically driven mechanisms.

The invention makes use of a method of control by which an amplifier is switched from a low output condition to a high output condition and then from a high output condition to a low output condition at intervals so regulated as to obtain an effective excitation which may be intermediate in value between the said high and low output conditions and which is variable by alteration of the relative durations of the periods of low and high power output of the amplifier. By this variable-width pulse method of control, the power dissipation in the amplifier can be kept relatively small by avoiding the relatively high power dissipation which ordinarily occurs in an amplifier when giving power outputs intermediate between maximum and minimum values. It is thus possible to control larger power outputs than could otherwise be controlled without undesirable over-heating of the amplifier.

The object of the present invention is to provide an improved apparatus for automatically controlling the speed of electrically driven mechanisms in which the variable-width pulse method of control above referred to is employed to good advantage in controlling mechanical power.

According to the invention, this is achieved by the combination of a power transmitting mechanism with variable slip in which the torque transmitted is dependent upon the intensity of a magnetising current, and a control amplifier for supplying the magnetising current and a variable-width pulse-generating means for switching said amplifier from a low power output condition to a high power output condition and then from a high power output condition to a low power output condition at intervals so regulated as to regulate the torque transmitted to the load by altering the relative durations of low and high power output conditions of the amplifier. A relatively large amount of power can thus be controlled by a transistor amplifier of relatively small dissipation capacity. The power-transmitting mechanism may be an eddy-current coupling or a magnetic clutch.

The invention will be fully understood from the following more detailed description by way of example of some embodiments thereof, reference being made to the accompanying drawings in which.

Figure 1:
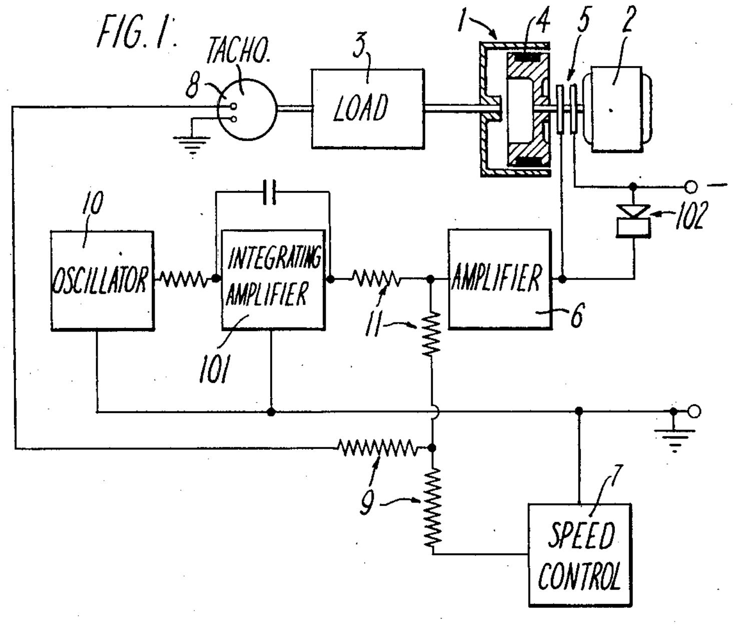
FIGURE 1 is a schematic diagram of one arrangement.
Figure 3:
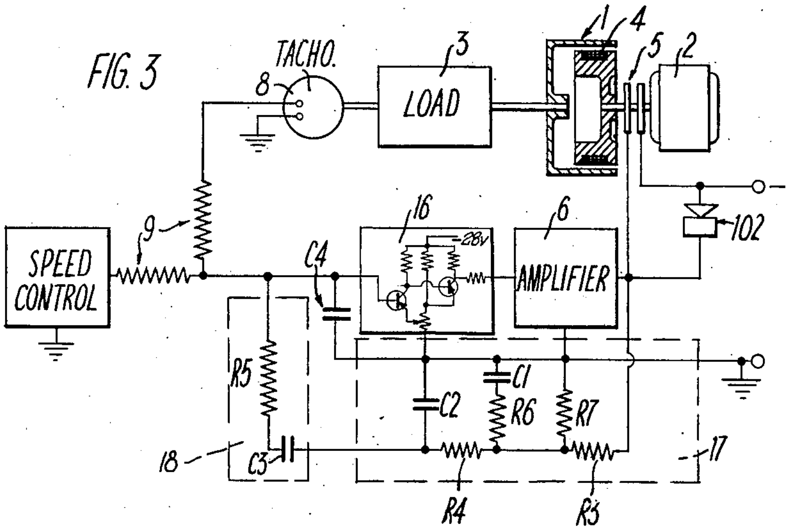
FIGURE 3 is a diagram of another arrangement.

In FIGURES 1 and 3 the reference numeral 1 indicates an eddy-current coupling adapted to transmit power from a driving motor 2 to a load 3 whose speed is to be controlled. The motor 2 may be an induction motor or any other type of motor having sufficient speed and power to drive the load 3 under all the required conditions.

Figure 2:
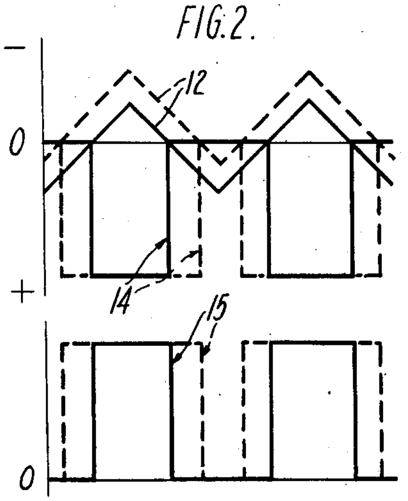
FIGURE 2 is a diagram of wave forms appearing at certain points in the circuit of FIGURE 1.

The exciting winding 4 of the eddy-current coupling is connected through slip rings 5 to the output of a two-stage transistor amplifier represented in FIGURES 1 and 2 by the box 6.

The box 7 in FIGURES 1 and 3 represents a source of control voltage which determines the speed at which the load 3 is to be controlled and which may be adjustable to set the speed to any desired value within the working range for which the system is designed. A tachometer-generator 8 arranged to be driven at the same speed as the load 3 or at a speed proportional to that of the load generates a feedback proportional to the speed of the load which is combined with the control voltage in a summing circuit 9 in such a way that the output of the circuit 9 is proportional to the difference between the control voltage and the feedback voltage obtained from the tachometer 8. The tachometer-generator 8 is thus an output element in that it generates a signal representing the output quantity and the circuit 9 is a comparison element in that its output is an "error" signal, i.e. it represents the deviation of the system.

The device represented by the reference numeral 10 in FIGURE 1 is an oscillator designed to produce a square-wave output and 101 is an integrating amplifier which transforms the square-wave output of the oscillator into a "sweep" voltage of triangular or saw-tooth form. The sweep voltage so obtained forms one of two inputs fed to a summing circuit 11, the other input being the "error" voltage representing the deviation of the system supplied by the summing circuit 9. The two inputs to the summing circuit 11 are combined together therein so as to apply an input current to the transistor amplifier 6 in the form of a saw-tooth wave whose mean value varies according to the value of the error signal. This input is represented in FIGURE 2 by the curves 12, the full-line curve showing the level of the input when the error signal is equal to zero whereas the broken line shows how the mean level of the input changes when the error signal rises to a positive value.

The amplitude of the input thus applied to the amplifier 6 in FIGURE 1 is made very large so that the input swings well above the level necessary to switch the amplifier to its maximum power output condition at one extremity of the sweep voltage and well below the level necessary to switch the amplifier to its minimum power output condition at the other extremity of the sweep voltage. The voltage output of the amplifier 6 thus assumes the square wave form represented by the curve 14 in FIGURE 2, the crests of these square waves occurring during "space" periods when the instantaneous value of the input to the amplifier 6 is negative, whereas the troughs occur during "mark" periods, when the instantaneous value of the input voltage is positive. The curve 15 in FIGURE 2 represents the corresponding current output for a non-inductive load and shows that the amplifier is switched to its maximum power output condition when the input 12 swings positive and is switched to its minimum power output condition when the input 12 swings negative. As the exciting winding 4 is necessarily highly inductive, a rectifier 102 is connected across it to allow the magnetising current to "flow" round the rectifier circuit during the "space" periods.

As can be seen from FIGURE 2, when the error voltage is zero, the mark and space periods are of equal duration, so that the average value of the output current is equal to half the maximum value. If the error voltage rises above the zero axis, the duration of the mark intervals is increased relatively to the space intervals, so that the average value of the output current to the winding 4 is increased; and if the error voltage falls below the zero axis the average value of the output current to the winding 4 is correspondingly reduced. The value of the current in the winding 4 is thus controlled in accordance with the error voltage by the relative durations of the maximum and minimum values of the output of the transistor. The loop gain of the system will ordinarily be made so high that the error voltage tends to zero as will be readily understood.

FIGURE 3 of the drawings, shows a modification of the arrangement shown in FIGURE 1 in which the separate oscillator 10 and integrating amplifier 101 of FIGURE 1 are omitted and in which the place of the summing circuit 11 is taken by an electronic switch 16 interposed between the summing circuit 9 and the amplifier 6. The electronic switch may consist of a bistable transistor trigger circuit having an output which controls the input of the transistor amplifier 6. It is arranged to have two stable conditions in one of which the output of the amplifier 6 is switched to its maximum value whereas in the other condition the output is switched off or reduced to its minimum value, intermediate degree of excitation of the winding 4 being obtained by variations in the relative durations of the two stable conditions of the trigger circuit.

The oscillations necessary to effect the periodic switching of the trigger circuit 16 are generated by the trigger circuit with the aid of a further feedback which proceeds from the winding 4 to the input of the trigger circuit, through an integrating circuit 17 and a coupling circuit 18.

The integrating circuit 17 comprises a resistance R4 and capacitance C2 connected in series with one another across the portion R7 of a potentiometer R3, R7 which receives the output voltage of the amplifier 6. An additional resistance R6 and capacitor C1 are connected in series with one another across the resistor R7 to improve the linearity of the integration.

Figure 4:
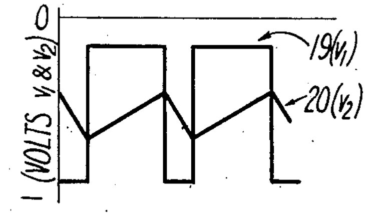
FIGURE 4 is a diagram of wave forms illustrating the controlling action of the system shown in FIGURE 3.
Figure 5:
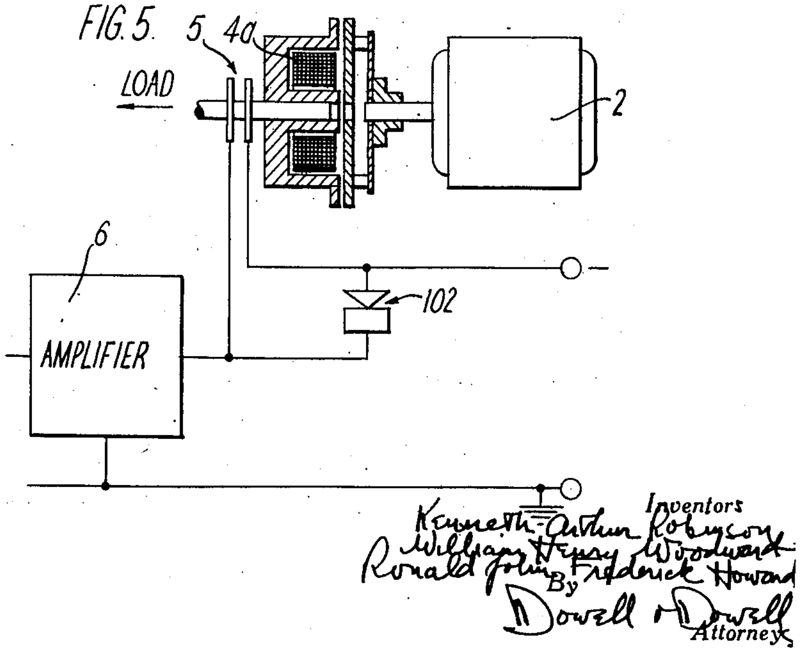
FIGURE 5 is a representation of a magnetic clutch which may be substituted for the eddy-current coupling shown in FIGURES 1 and 3.

The integrating circuit 17 is designed so that its output approximates to the integral of the difference between the input voltage it receives from the winding 4 and the output voltage appearing across its output condenser C2. This output voltage therefore has a D.C. component proportional to the effective mean value of the coil excitation resulting from the relative durations of the mark periods when the output of the amplifier is switched to its maximum value, and the space periods when the amplifier output is switched to its minimum value. It also has an alternating component which gives it its saw-tooth form. This is illustrated in FIGURE 4 of the drawings in which the rectangular wave 19 represents the input voltage $v_1$ obtained from the winding 4 and the saw tooth wave 20 represents the output voltage $v_2$ appearing across the condenser C2. It will be noted that the voltage $v_2$ increases during the mark periods at a rate proportional to the difference between the maximum value of the voltage $v_1$ and the standing value of the voltage $v_2$ and falls during the space periods at a rate proportional to the standing value of the voltage $v_2$. This enables the fluctuation of the voltage $v_2$ when communicated to the trigger circuit 16 to switch the trigger at intervals corresponding to the mark and space intervals of the rectangular wave 19 determined solely by the standing value of the voltage $v_2$. The system is thus capable of maintaining the mean excitation of the field winding 4 at any level at which the deviation tends to zero. The "standing" value of the voltage $v_2$ at any moment is the prevailing level of the D.C. component of that voltage, i.e. the mean value of voltage over a complete saw-tooth wave at any given moment. As in the arrangement shown in FIGURE 2, a rectifier 102 is connected across the winding 4 to allow the magnetising current to flow round the rectifier circuit during the periods when the output stage of the amplifier is cut off.

The coupling circuit 18 is designed to transmit the saw-tooth wave component of the voltage $v_2$ with little or no distortion, but at lower frequencies it responds to the rate of change of the D.C. level of the voltage $v_2$ and thus introduces a control action which limits the rate of increase or decrease of the effective field excitation which results from a positive or negative deviation signal. The gain round the loop which includes the feedback from the winding 4 to the trigger 16 is made sufficiently high to ensure that the trigger circuit is switched at a sufficiently high frequency to obtain excitation of the field winding 4 at an effective level determined by the relative durations of the mark and space periods. The control loop including the feedback from the tachometer 8 has a very high gain such that the error voltage tends to zero for any value of the current in the winding 4.

In the operation of the system shown in FIGURE 3, when the deviation is sufficiently near zero, the system operates with a mean excitation determined by the standing value of the D.C. component of the voltage $v_2$. When a deviation signal occurs (owing for example to an increase or decrease in the set speed signal from the box 7) the relative duration of the mark and space periods is automatically increased or diminished so as to produce an increase or decrease in the D.C. component of the voltage $v_2$ in the sense to compensate for the deviation. Owing to the differentiating action of the coupling circuit 18, only a voltage proportional to the rate of change of this D.C. component is fed back to the trigger input. Consequently, the relative duration of the mark and space periods continues to increase or decrease at a rate proportional to the deviation. In other words, only the rate of change of the effective excitation is limited by the value of the deviation and the correcting action will thus continue until the deviation disappears.

Whilst a system in which the coupling circuit 18 is designed to give an integral control action has been described, by way of example, the invention is not limited to this, as various shaping circuits could be substituted for the circuit 18 to obtain desired control actions. The only restriction that must be placed on the coupling circuit is that it must conduct the saw-tooth wave component of the voltage $v_2$ sufficiently well to maintain the system in oscillation at a sufficiently high frequency to excite the field winding 1 at an effective level determined by the relative durations of the mark and space periods. This frequency should not be lower than say ten cycles per second and may be as high as 5,000 cycles per second.

A condenser C4 is connected across the input terminals of the trigger circuit to prevent spurious conditions.

The magnetic clutch shown in FIGURE 4 may be a slipping clutch of any known type in which the torque transmitted depends upon the degree of excitation of a magnetising winding *4a*. It is sometimes convenient to use a clutch of the type in which the drive is transmitted by ferromagnetic particles suspended in a variable magnetic field between relatively rotatable driving and driven members.

We claim:

1. A control system comprising an electromagnetically controlled variable slip torque-transmitting mechanism having a driving member, a driven member and an exciting winding effective for controlling the torque transmitted from said driving member to said driven member, a control amplifier having an input circuit and an output circuit connected to said exciting winding for controlling the current supply to said exciting winding, a control circuit and variable-width pulse-generating means controlled by said control circuit for switching said amplifier from a low power-output condition to a high power-output condition and then from a high power-output condition to a low power-output condition at intervals so regulated as to regulate the torque transmitted to said driven member by altering the relative durations of the high and low power-output conditions of said amplifier.

2. A control system comprising an electromagnetically controlled variable slip torque-transmitting mechanism having a driving member, a driven member and an exciting winding effective for controlling the torque transmitted from said driving member to said driven member, a control amplifier having an input circuit and an output circuit connected to said exciting winding for controlling the current supply to said exciting winding, a trigger circuit having an input and an output coupled to the input of said control amplifier for switching the same either to a low power-output condition or to a high power-output condition and a feedback path comprising an integrating circuit having an input derived from the output of said control amplifier and an output approximating to the integral of the difference between the input of said integrating circuit and the output thereof, and a coupling circuit connected between the output of said integrating circuit and the input of said trigger circuit.

3. A control system comprising an electromagnetically controlled variable slip torque-transmitting mechanism having a driving member, a driven member and an exciting winding effective for controlling the torque transmitted from said driving member to said driven member, a control amplifier having an input circuit and an output circuit connected to said exciting winding for controlling the current supply to said exciting winding, a summing element having two inputs and a single output coupled to the input of said amplifier, an oscillator, an integrating amplifier having an input coupled to said oscillator and an output coupled to one of the inputs of said summing element, a source of control voltage, an output element, a comparison element having two inputs and an output coupled to the other of the inputs of said summing element, said source of control voltage being coupled to one of the inputs of said comparison element and said output element being coupled to the other of said inputs.

4. A control system comprising an electromagnetically controlled variable slip torque-transmitting mechanism having a driving member, a driven member and an exciting winding effective for controlling the torque transmitted from said driving member to said driven member, a control amplifier having an input circuit and an output circuit connected to said exciting winding for controlling the current supply to said exciting winding, a trigger circuit having an input and an output coupled to the input of said control amplifier for switching the same either to a low power-output condition or to a high power-output condition, a comparison element having two inputs and an output coupled to the input of said trigger circuit, a source of control voltage coupled to one of the inputs of said comparison element, an output element coupled to the other of the inputs of said comparison element and a feedback path comprising an integrating circuit having an input derived from the output of said control amplifier and an output approximating to the integral of the difference between the input of said integrating circuit and the output thereof, and a coupling circuit connected between the output of said integrating circuit and the input of said trigger circuit.

References Cited in the file of this patent

UNITED STATES PATENTS 2,788,104 Mason ---------------- Apr. 9, 1957